Sept. 23, 1924.  
E. F. WEGNER  
1,509,743  
AUTOMATIC CONTROL FOR AEROPLANES AND DIRIGIBLE BALLOONS  
Filed April 26, 1921   5 Sheets-Sheet 5
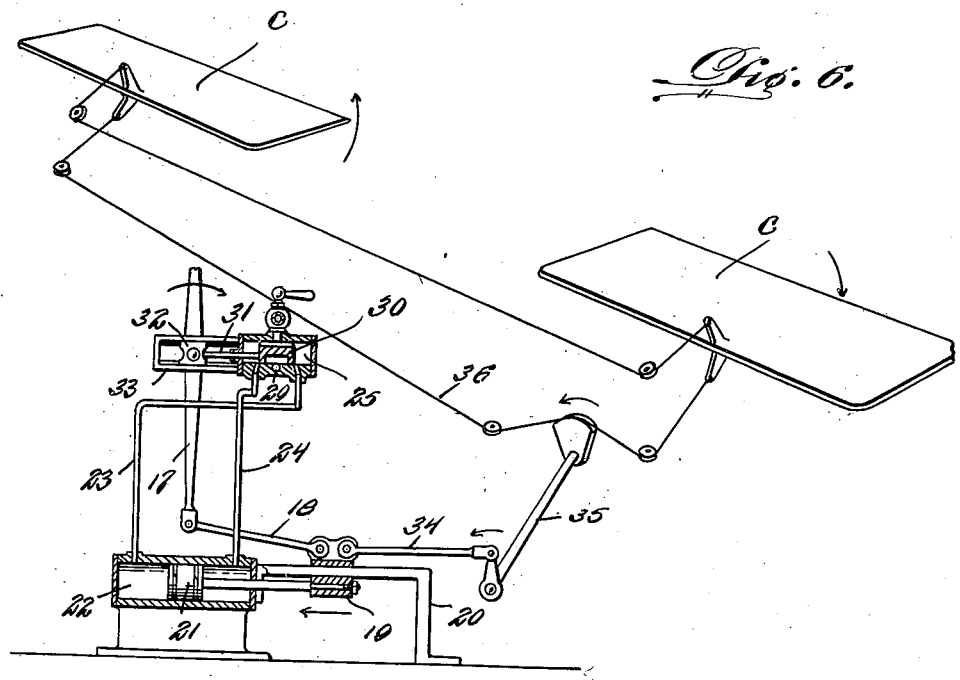
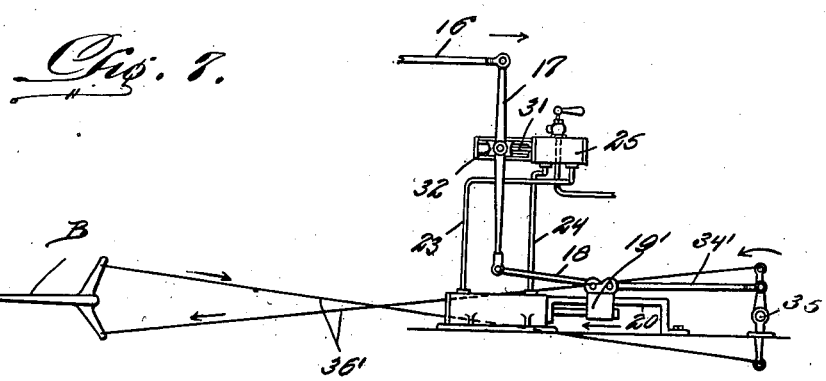

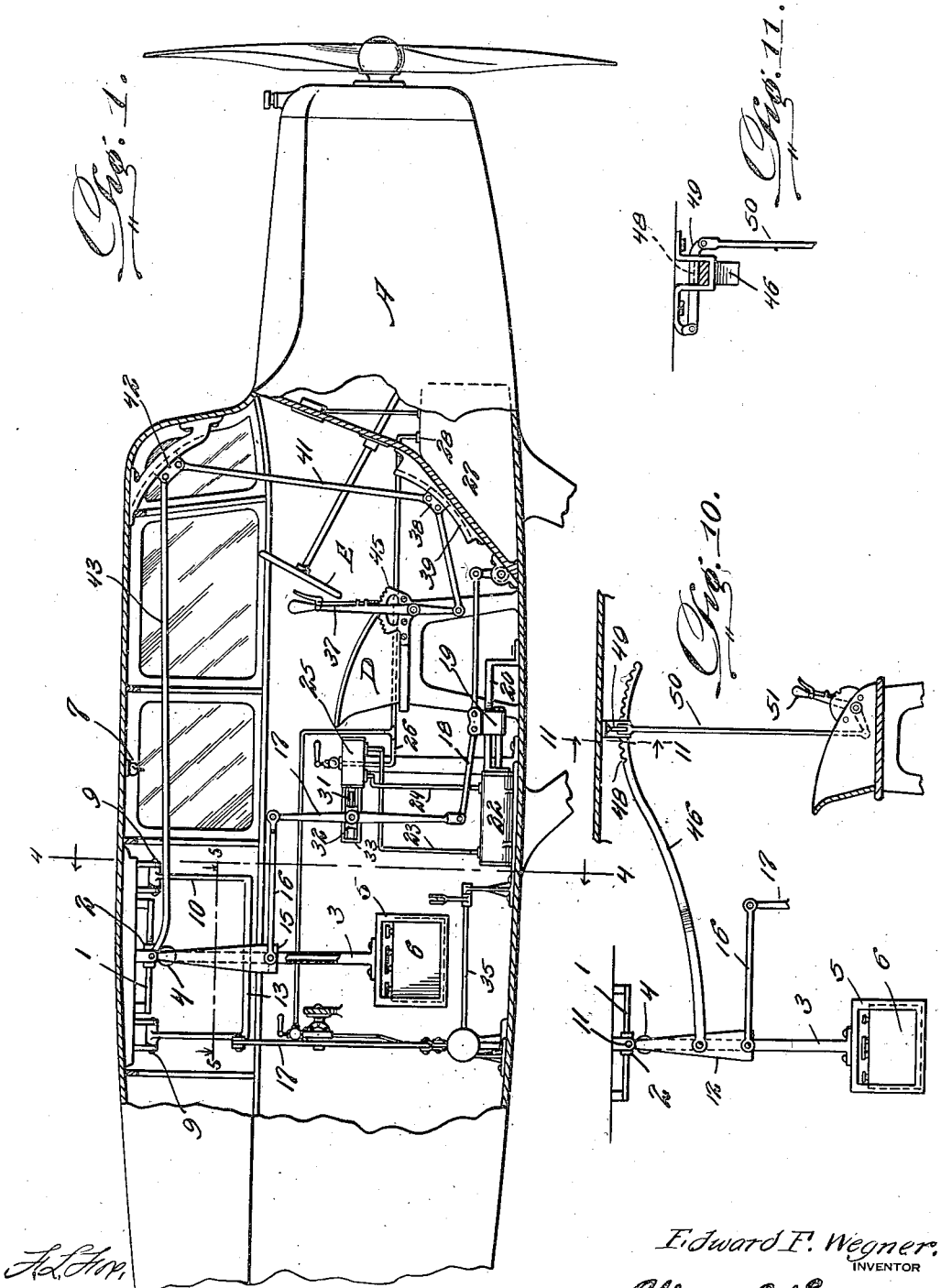

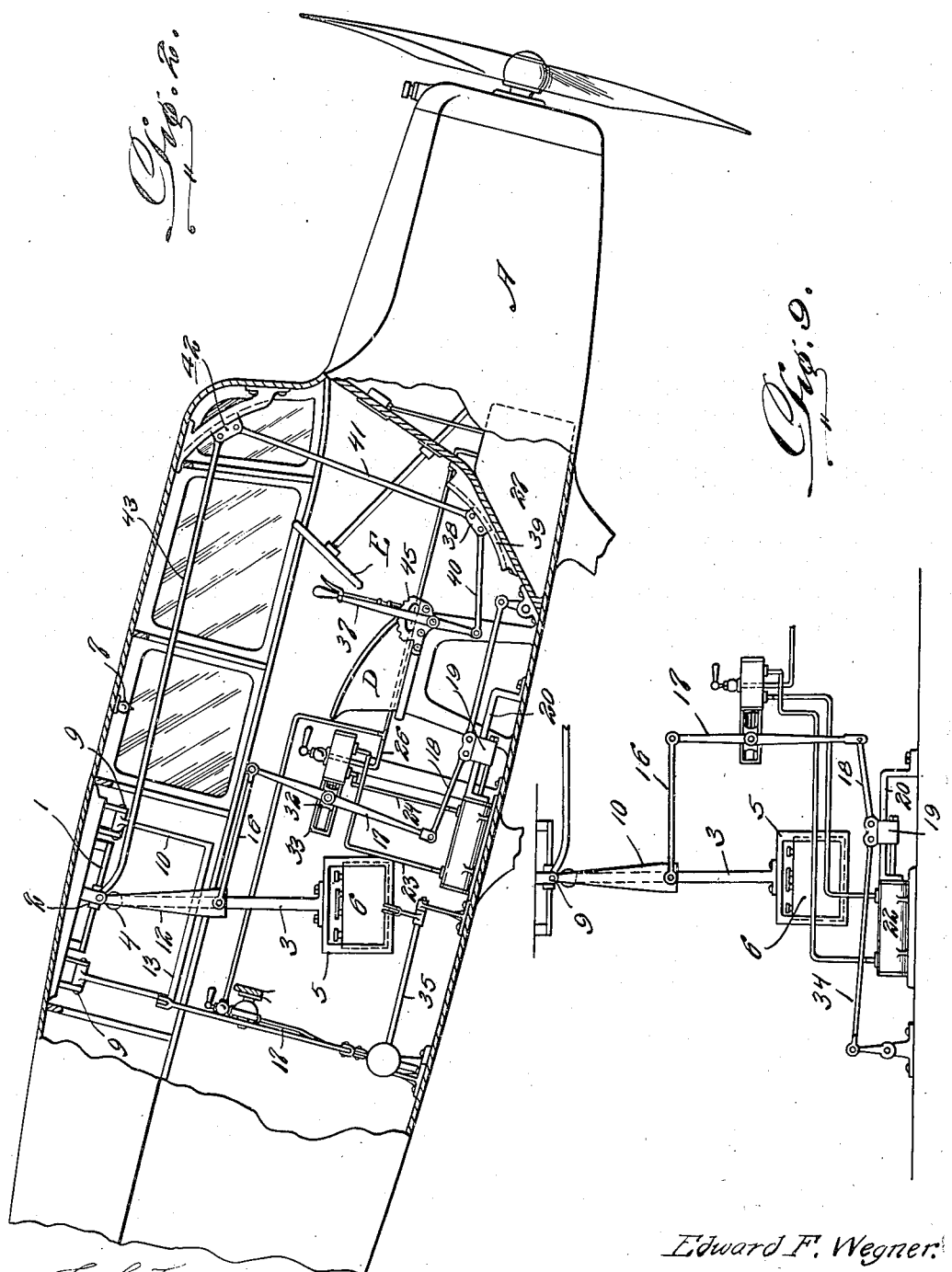

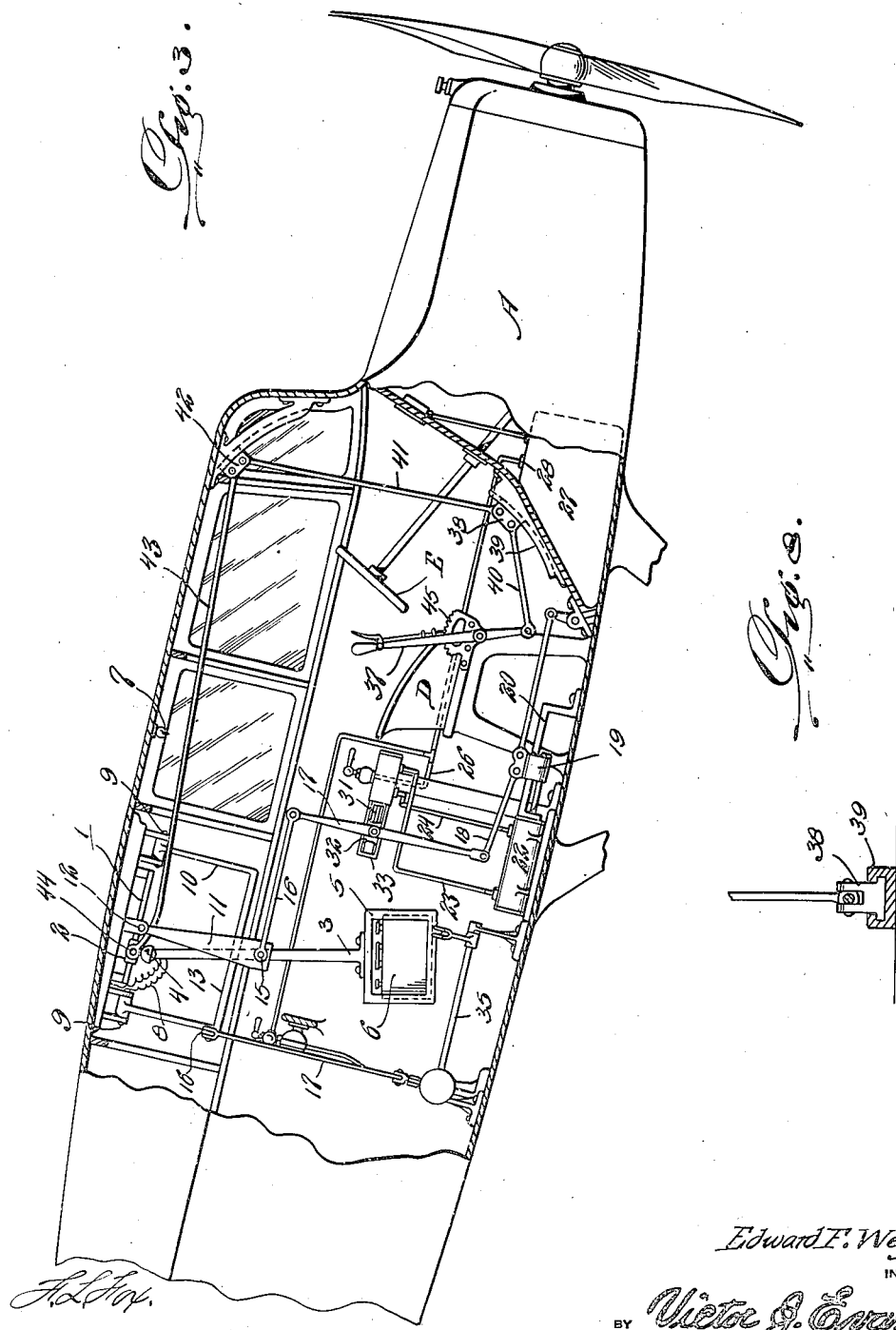

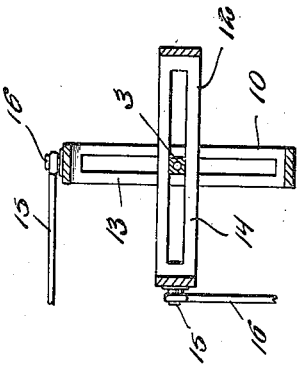
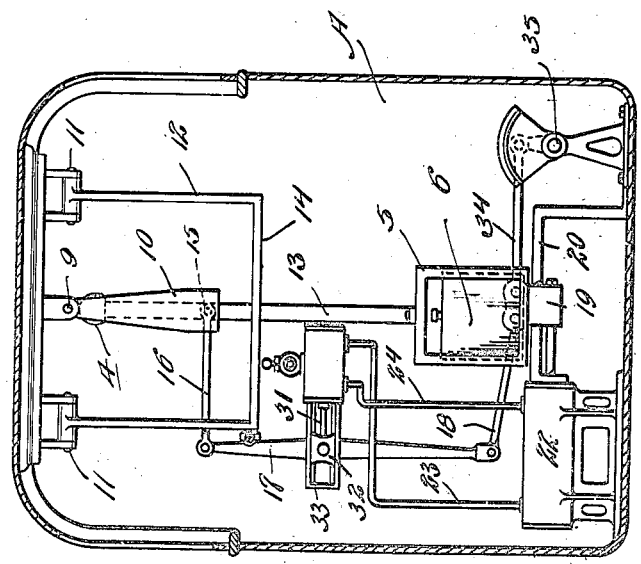

Patented Sept. 23, 1924.

1,509,743

UNITED STATES PATENT OFFICE.

EDWARD F. WEGNER, OF COUNCIL BLUFFS, IOWA.

AUTOMATIC CONTROL FOR AEROPLANES AND DIRIGIBLE BALLOONS.

Application filed April 26, 1921. Serial No. 464,494.

*To all whom it may concern:*

Be it known that I, EDWARD F. WEGNER, a citizen of the United States, residing at Council Bluffs, in the county of Pottawattamie and State of Iowa, have invented new and useful Improvements in Automatic Controls for Aeroplanes and Dirigible Balloons, of which the following is a specification.
This invention relates to an automatic control for aeroplanes and dirigible balloons, the general object of the invention being to provide means for automatically keeping the machine prefectly balanced without requiring any attention on the part of the operator, thus permitting him to give all his attention to the guiding of the machine.

Another object of the invention is to provide means for permitting the operator to adjust the automatic controlling means so that he can ascend or descend at any desired inclination, the automatic control keeping the machine at this inclination.
A further object of the invention is to provide a pendulum for actuating the controlling means and using batteries to give weight to the pendulum, said batteries furnishing the current for the lighting system of the aeroplane.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view showing the application of the invention to an aeroplane.
Figure 2 is a similar view but showing the position of the parts if the aeroplane should accidentally start to descend.

Figure 3 is a view similar to Figure 2 but showing the position of the parts when the operator has set the same to cause the machine to descend.

Figure 4 is a section on line 4—4 of Figure 1.

Figure 5 is a section on line 5—5 of Figure 1.

Figure 6 is a diagrammatic view, with parts in section, showing the compressed air operated mechanism for controlling the ailerons.

Figure 7 is a diagrammatic view, the parts being shown in elevation, of the air control for the elevators.

Figure 8 is a sectional detail view of one of the sliding cross heads for the connecting rods which connect the hand lever with the pendulum cross head.

Figure 9 is a diagrammatic view showing the arrangement of parts when used for controlling the elevators of a dirigible.

Figure 10 is a diagrammatic view showing the means for rendering the controlling mechanism inoperative.

Figure 11 is a section line along 11—11 of Figure 10.

In these views A indicates the fuselage of the machine, B the elevators and C the ailerons. D indicates the pilot's seat and E the steering wheel.

In carrying out my invention I locate a guiding bar 1 in the upper part of the fuselage which extends longitudinally of the machine and slidingly supports the cross head 2 for the pendulum 3, the pendulum being connected with said cross head by the ball and socket joint 4. The pendulum rod is of square shape in cross section and is hollow and at its lower end is connected with the casing 5 in which are arranged the electric batteries 6 for furnishing the current to the lamps 7 in the fuselage. The wires 8 of the batteries to the lamps may pass through the hollow pendulum rod from the batteries and leave said rod adjacent the ball and socket joint where the movement is slight.

A pair of journal pins 9 is placed in alignment with the guiding bar 1, one at each end thereof, for receiving the elongated journals of the hangers 10 while a pair of brackets 11 are located one on each side of the center of said bar 1 to pivotally support the hangers 12 so that said hangers are placed at right angles to the hangers 10. The lower ends of the hangers 10 are connected together by the slotted cross piece 13 while the lower ends of the hangers 12 are connected together by the slotted cross piece 14, the hangers 10 are located above the cross piece 4 with a space between them. The square stem of the pendulum passes through the slots in said cross pieces so that the movement of the pendulum will be communicated to the hangers. For instance, if the pendulum swings transversely of the car the hangers 10 and cross piece 13 will be swung on their pivots while if the pendulum swings longitudinally of the car the hangers 12 will be swung on their pivots. If the pendulum should move diagonally both sets of hangers would be moved on their pivots.

Each of the cross pieces 13 and 14 is provided with a pin 15 at one end thereof which is engaged by one end of a connecting rod 16, the other end of which is connected with a vertically arranged rod 17 which is connected by the rod 18 with the cross head 19 slidably mounted on the guide 20. This cross head 19 is connected with the piston rod of the piston 21, located in cylinder 22, which has its ends connected by the pipes 23 and 24 with the valve chest 25 which is connected by pipe 26 with a compressed air tank 27, a three-way valve 28 being arranged at the junction of said pipe with the chest. Said chest is provided with an exhaust port 29 and a slide valve 30 is arranged to control the ports leading to pipes 23 and 24 and said exhaust port. This valve is connected by a rod 31 with the sliding head 32, mounted in the guide 23. This head is connected with the central part of rod 17 so that it will be moved when said rod is moved to actuate the slide valve in the chest.

It will thus be seen that when the hangers are moved by the pendulum this movement will be communicated to rod 17 through the connecting rod 16 and this movement of rod 17 will cause the slide valve to move in one direction or the other so as to connect one of the pipes 23 or 24 with the exhaust port and the other pipe with the interior of the valve chest so that the compressed air from said chest will flow into the cylinder 22 and thus actuate the piston, and as said piston is connected with the cross head 19, said cross head will move with the piston. The cross head which is actuated by the hangers 10 is connected with the ailerons C by the connecting rod 34, crank shaft 35 and the cables 36 while the cross head 19′ is connected with the elevators B by means of the connecting rod 34′, crank shaft 35″ and the cables 36.

It will be seen that when piston 21 has moved the cross head a certain extent the rod 18 will move rod 17 to restore the valve to its normal position and as soon as the aeroplane returns to an even keel the pendulum will move the parts to cause the slide valve to act to permit the compressed air to return the piston to its normal position.

The means for manually controlling the controlling means for causing the aeroplane to ascend or descend comprises a hand lever 37 located adjacent the pilot's seat and being connected with a sliding cross head 38 operating in a curved guide 39, by the connecting rod 40. A vertically arranged connecting rod 41 connects the cross head 38 with a similar cross head 42 at the top of the fuselage and this cross head 42 is connected by the rod 43 with the pin 44 on the cross head 2 of the pendulum. Thus by manipulating said lever 37 the pilot can move the pendulum cross head so as to move the elevators to a position which will cause the aeroplane to ascend or descend and the controlling means will automatically hold the aeroplane at a certain inclination as it ascends or descends. By placing the lever 37 in the desired position on the quadrant 45 the inclination of the ascent or descent can be kept at the desired angle, the angle being adjusted by the position of said lever.

The extent of movement of the elevators and ailerons is in accordance with the extent of movement of the pendulum as the greater the amount of movement of the pendulum the greater will be the amount of movement of the elevators or ailerons. As the plane rights itself the pendulum swings back to its normal position, thus returning the controlling means to their normal position.

When slide valve 30 is in its central position both of the pipes 23 and 24 are open and compressed air can pass to both sides of the piston thus keeping said piston in its central position. As soon as the piston is moved to one side or the other the valve is also moved so as to open one of the pipes to exhaust while keeping the other pipe open so that the air pressure will force the piston back to its central position. This action will prevent the piston from moving back and forth and churn the air in the valve chest as the slightest movement of the piston will cause the valve to move to control the air supply to the cylinder.

The control is very simple and there is nothing to get out of order. If anything should happen to the controlling means the valves 28 can be turned to shut off the air supply to the valve chest and open the same to the atmosphere, thus rendering the controlling means inoperative and permitting the plane to be controlled in the usual manner.

Figure 9 shows the device used for controlling the elevators of a dirigible balloon. As such a balloon is not provided with the ailerons the second set of hangers are not necessary so that this device simply includes the one set. In other respects this form of the invention is similar to that above described.

The pressure in the tank 27 may be provided by an air pump connected with one of the motors of the plane or this pressure may be secured in any other way.

It will be seen that with my invention applied to a plane the pilot need pay no attention to the elevators and ailerons as these are automatically controlled by my improved controlling means. This leaves the pilot free to control the motors and to steer the plane.

I also provide means for locking the elevator control hangers against swinging movement which is desirable when starting or landing on rough ground. Such means is shown in Figure 10 and consists of a curved bar 46 having its forked end connected with the hangers 10 and its other end passing through a stirrup 47 which is secured to the top of the fuselage. The upper edge of the bar is provided with notches 48 for receiving the locking lever 49 which is pivoted at one end to a part of the stirrup and which passes through the slot in said stirrup. The other end of this locking lever is connected by the vertical bar 50 with the hand lever 51 pivotally secured to the pilot's seat. Thus when the pendulum is to be held against swinging movement it is simply necessary to pull upwardly the lever 51 to cause the bar 50 to move the locking lever downwardly into engagement with one of the notches in the curved bar 46 to hold said bar and the hangers against movement. The elevators can be controlled in the ordinary manner.

As shown in Figure 10 the bar 46 is of forked construction, the prongs of the forks being connected to the center of the ends of the hangers 10. When the locking device is used, the elevators can be controlled by using the lever 37 as by pulling said lever back the pendulum cross head will be moved back and rod 17 will be moved ahead on account of the hangers 10 being held in stationary position by the locking means.

By using lever 37 as a hand control for the elevators when the lock is used the pilot is merely moving the slide valve back and forth in the air chest of the elevator control and the air does the work of moving the elevators. When machine is to be used without air control the three-way cock is turned to open the chest to the atmosphere.

While I have shown the box forming a part of the pendulum as containing batteries it will of course be understood that this pendulum may be weighted in any other desired manner.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. The combination with an aeronautic device, of a pendulum supported for pivotal longitudinal and transverse movement and being susceptible of a longitudinal slidable movement, means associated with said pendulum for automatically controlling the equilibrium of the device, manual means for controlling the automatic means and including a curved bar pivotally secured at one end to the means associated with said pendulum, a supported stirrup receiving the upper end of said bar, notches formed on this end, a locking lever designed to singly engage the notches and means for controlling the lock lever as and for the purpose specified.

2. The combination with an aeronautic device, of a horizontally disposed guiding bar supported from the upper part of the fuselage of the device and arranged longitudinally thereof, a cross bar slidably mounted on the guiding bar, a hollow pendulum rod pivotally secured to said cross bar, a casing secured to the lower end of the bar, a storage battery mounted within the casing and providing a pendulum together with said hollow rod, said hollow rod being adapted to receive the wires of the battery, said wires being trained therethrough and thence to lamps for illuminating the fuselage means acted upon by the pendulum rod for automatically retaining the equilibrium of the device and means for locking said pendulum as and for the purpose specified.

In testimony whereof I affix my signature.

EDWARD F. WEGNER.